Jan. 2, 1934.    E. LE DOUX    1,942,298
EYEGLASSES
Filed Dec. 13, 1932
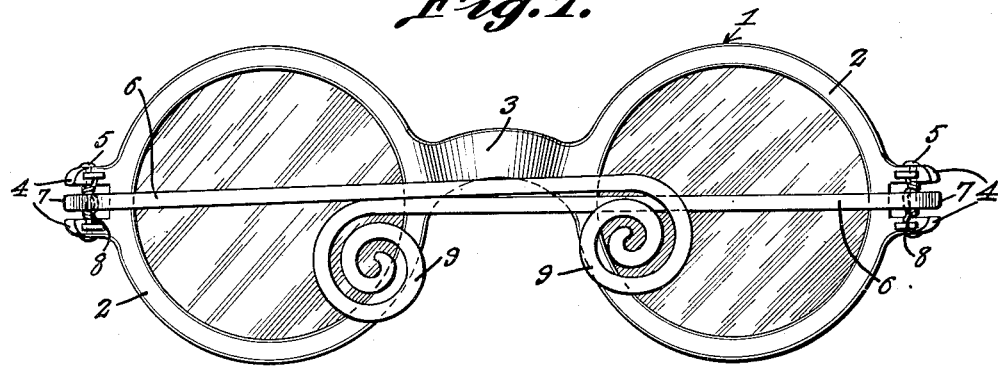
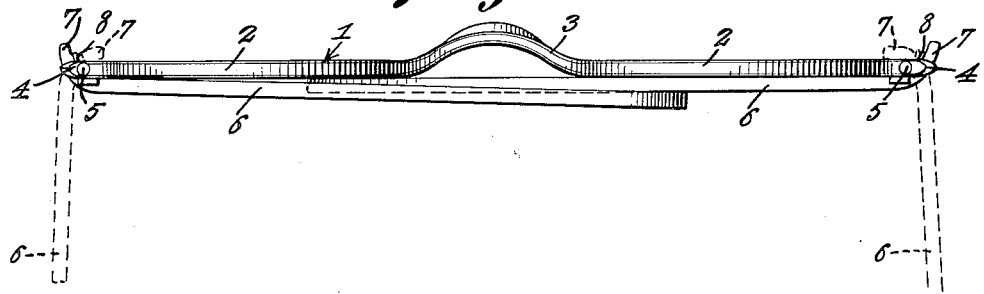
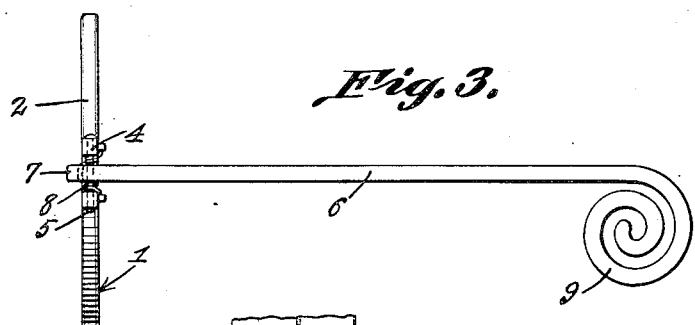
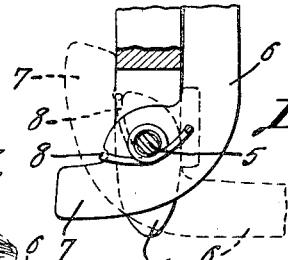
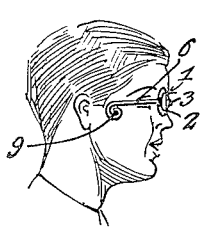
Edward Le Doux, INVENTOR
BY Victor J. Evans & Co.
ATTORNEY Patented Jan. 2, 1934

1,942,298

UNITED STATES PATENT OFFICE 1,942,298

EYEGLASSES

Edward Le Doux, Pawtucket, R. I., assignor of one-third to Alfred Le Doux and one-third to Clement Le Doux, Pawtucket, R. I.

Application December 13, 1932
Serial No. 647,045

1 Claim. (Cl. 88—53)

This invention relates to eyeglasses and more particularly to glasses of the spectacle type, and has for the primary object, the provision of improved temple bars and their connection with the lens frame so that the wearer may more easily and quickly apply and remove the temple bars and the latter when applied effectively grip the temples in advance of the ears, thereby maintaining the lenses in proper position with respect to the eyes and obviating the positioning of the temple bars in rear of the ears, also presenting an improved appearance to the device when worn as well as the temple bars assuming a folded position on the removal from the wearer.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is an elevational view illustrating a spectacle frame with the temple bars in a folded position and showing the construction of the temple bars.

Figure 2 is a top plan view illustrating in dotted lines the temple bars in operative position.

Figure 3 is a side elevation illustrating the device.

Figure 4 is an enlarged fragmentary sectional view showing the connection of the temple bars with the frame.

Figure 5 is a view showing the spectacles applied to a person.

Referring in detail to the drawing, the numeral 1 indicates a spectacle frame having the usual lens supporting portions 2 connected by a bridge 3. Spaced ears 4 are formed on the lens supporting portions 2 and carry pivot pins 5 which extend through temple bars 6 for hingedly connecting the bars to the frame 1. The pivoted ends of the temple bars are offset or curved to form projections 7 engaged by springs 8 mounted on the pivot pins and engageable with the ears 4. The action of the springs is to urge the temple bars into folded or inoperative position, as shown in Figure 1. The projections 7 when the temple bars are in operative position, as shown in Figure 2 by dotted lines, abut the frame 1 for the purpose of preventing the temple bars from being moved apart beyond operative position.

The temple bars 6 are shorter than the average temple bars and their free ends are bent to form face engaging portions 9 and in this instance are shown as being of coiled formation providing an artistic appearance as well as affording a comparatively large portion to engage the face of the wearer.

In use, the temple bars are swung apart into operative position and the frame 1 applied to the face or nose with the face engaging portions 9 bearing against the temples of the wearer in advance of the ears, thereby firmly maintaining the frame on the nose of the person with the lenses supported properly in advance of the eyes. The springs acting upon the temple bars cause the face engaging portions 9 to engage the temples with sufficient pressure to prevent accidental displacement of the frame from the wearer. By the temple bars terminating and engaging the temples of the person will obviate the placing of the temple bars behind the ears, thereby greatly facilitating the application and removal of the frame as the temple bars will not interfere with a hat worn by the person or the hair.

While the face engaging portions 9 of the temple bars are shown of coiled formation, they may be bent into other artistic shapes.

While I have shown and described the preferred embodiment of my invention, it will be understood that minor changes in construction, combination and arrangement of parts may be made without departing from the spirit and scope of my invention, as claimed.

Having described the invention, I claim:

A spectacle frame comprising connected lens supporting rims, pairs of ears formed on said rims, pins connecting the ears of each pair, temple bars journaled on the pins and engaging at their free ends the temples of a person, curved extensions on the journaled ends of the bars to abut the rims for limiting the spreading of the bars apart, and tension springs on the pins and engaging the ears and extensions to urge the bars toward each other and cause said bars to tightly grip the temples of a person when worn by said person.

EDWARD LE DOUX.